United States Patent [19]

Kao

[11] Patent Number: 5,341,596

[45] Date of Patent: Aug. 30, 1994

[54] AUTOMATIC WATER SUPPLY DEVICE FOR POTTED PLANTS

[76] Inventor: Hsin-Lin Kao, No. 1-2, Lane 975, Chun-Jih Road, Tao-Yuan City, Taiwan

[21] Appl. No.: 40,285

[22] Filed: Mar. 30, 1993

[51] Int. Cl.⁵ ............................................. A01G 25/00
[52] U.S. Cl. ............................................. 47/79; 47/81
[58] Field of Search .................... 47/71, 66, 79, 791, 47/81

[56] References Cited

U.S. PATENT DOCUMENTS

| | | | |
|---|---|---|---|
| 1,216,642 | 2/1917 | White | 47/80 |
| 2,638,716 | 5/1953 | Luipersbek | 47/79 I |
| 2,770,957 | 11/1956 | Bronson | 47/71 |
| 3,769,748 | 11/1973 | Goldring | 47/80 |
| 4,344,251 | 8/1982 | Edling | 47/80 |
| 4,435,918 | 3/1984 | Shain | 47/79 |
| 5,125,184 | 6/1992 | Anderson | 47/66 |
| 5,129,183 | 7/1992 | Haw | 47/81 |
| 5,136,806 | 8/1992 | Kang | 47/81 |
| 5,155,934 | 10/1992 | Leider | 47/79 |

FOREIGN PATENT DOCUMENTS

| | | | |
|---|---|---|---|
| 212072 | 11/1960 | Austria | 47/81 |
| 2149072 | 4/1973 | Fed. Rep. of Germany | 47/81 |
| 2404818 | 8/1975 | Fed. Rep. of Germany | 47/81 |
| 3035128 | 5/1982 | Fed. Rep. of Germany | 47/81 |
| 4000950 | 7/1990 | Fed. Rep. of Germany | 47/66 |
| 1024483 | 1/1953 | France | 47/80 |
| 465067 | 8/1951 | Italy | 47/81 |

Primary Examiner—Ramon S. Britts
Assistant Examiner—Joanne C. Downs
Attorney, Agent, or Firm—Morton J. Rosenberg; David I. Klein

[57] ABSTRACT

An automatic water supply device for potted plants is provided. The device includes a housing having a reservoir incorporated therein, the reservoir being equipped with a plurality of supporting ribs, the disk member having a plurality of draining holes formed along its periphery. An observation hole is formed through the disk member for measuring the water level of the reservoir. The disk member is further provided with a through opening formed in the center portion thereof. A water controlling sleeve, which is made from plastic material, is positioned within the central opening of the disk member. The sleeve member is formed with a passage formed through its length. The sleeve member has a first bead portion on one end and a second bead portion below the first bead portion. The distance between the first bead portion and the second bead portion is equivalent to the thickness of the disk member. The controlling sleeve further includes an outer wall portion having threads formed thereon, with a nut being screwed thereon. The sleeve further includes a plurality of clip members formed at a bottom portion thereof, and a wick member is inserted into the passage of the controlling sleeve. The wick member is projected high above said first bead portion of the controlling sleeve for insert into the drainage hole of a pot for a plant.

4 Claims, 6 Drawing Sheets

AUTOMATIC WATER SUPPLY DEVICE FOR POTTED PLANTS

FIELD OF THE INVENTION

This invention relates to a water supply device and, more particularly, to an automatic water supply device for a potted plant. Cultivating flowers or plants in a pot, or the like, is one of the key desires of modern man. This has become more and more important as it has become extremely difficult to find a piece of cultivatable land. But, the cultivating of plants in a port requires the following problems to be overcome, in order to obtain a rich harvest.

First, the gardener must add water to the pot periodically. But, modern citizens always have business trips, the plants therefore may wither, due to the short supply of water. It is indeed a pity to see a lovely plant withered when one comes back from a business trip.

Second, existing pots have a discharge hole in their bottom. It functions to discharge excess water in the soil, to prevent the root from rotting. But, it also brings some inconvenience, as water is added to it, the excess water will flow out on the floor, causing the home owner much difficulty and adding dirt to the house. The problem is controlled by disposing a dish under the pot for receiving the excess water. After a certain time, however, the dish becomes filled with mud, diminishing the aesthetic appearance of the plant.

Third, as the dish is filled with mud, the user must always clean it to prevent the mud from being scattered all around.

Fourth, the patent entitled "An Improved Pot Member with an Automatic Water Supply" provides a solution to the above problems but it has the following shortcomings:

1. The inlet is too small to add water and the water is scattered all around.
2. The water added to the pot cannot be controlled appropriately. Some plants need a large amount of water, while others do not. If the water is not controlled suitably, the roots of some plants will rot and some plants will wither.
3. If the pot is brought outdoors to receive sunshine, but is exposed to a sudden rain, the excess water cannot be discharged immediately and consequently the roots will rot.
4. The prior art device cannot be used with an existing pot. In light of this, the prior art device cannot benefit the user. To use the device, a user must transplant the existing plant to the device, and breaking the existing pot is inevitable. Additionally, the plant tends to wither when it is transplanted.

SUMMARY OF THE INVENTION

It is the object of this invention to provide an improvement for a water supply device for plants in which a water wicking member is provided to supply the plant with water automatically.

It is still another object of this invention to provide a controlling sleeve for the wicking member for regulating a suitable amount of water to the plant.

It is the further object of this invention to provide an automatic water supply device which can be used directly with an existing pot, without the need of transplanting the plant. This can greatly reduce the withering rate of the plant, and can provide an overall aesthetic appearance for the potted plant.

BRIEF DESCRIPTION OF THE DRAWING

Other features and advantages of the present invention will become apparent when the following description is read in conjunction with the accompanying drawings, wherein.

DESCRIPTION OF THE PREFERRED EMBODIMENTS

Figure 1:
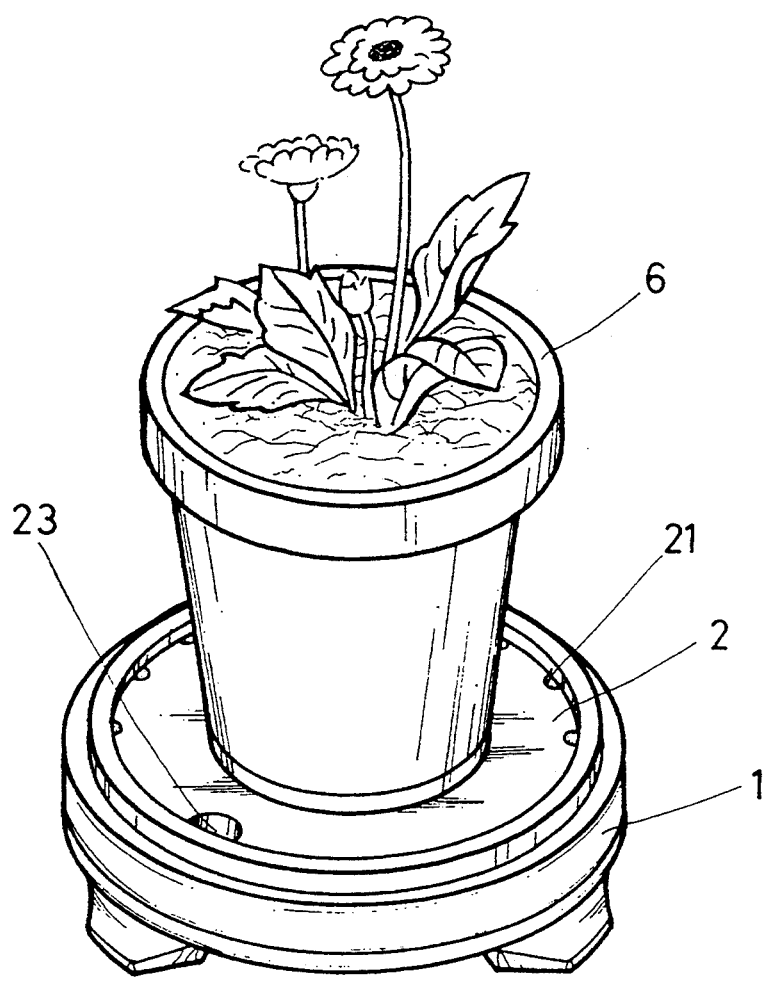
FIG. 1 is a perspective view of an embodiment of an automatic water supply device with a potted plant made according to the instant invention.
Figure 2:
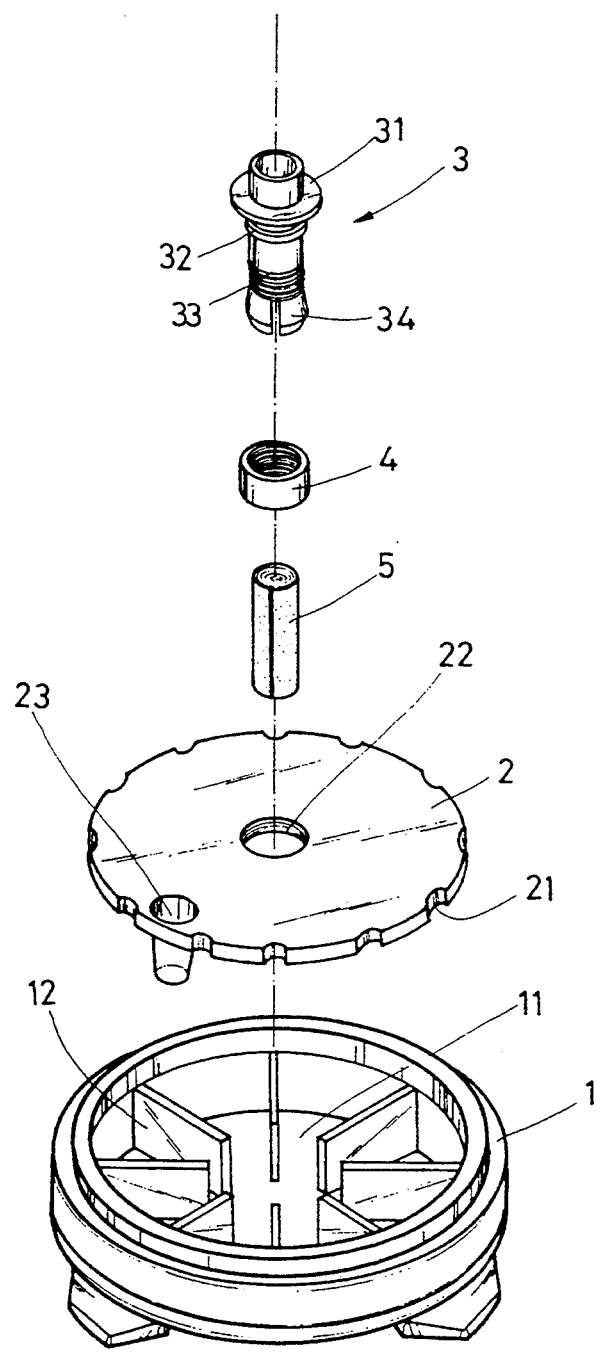
FIG. 2 is an exploded view of the automatic water supply device for a potted plant made according to the instant invention.
Figure 3:
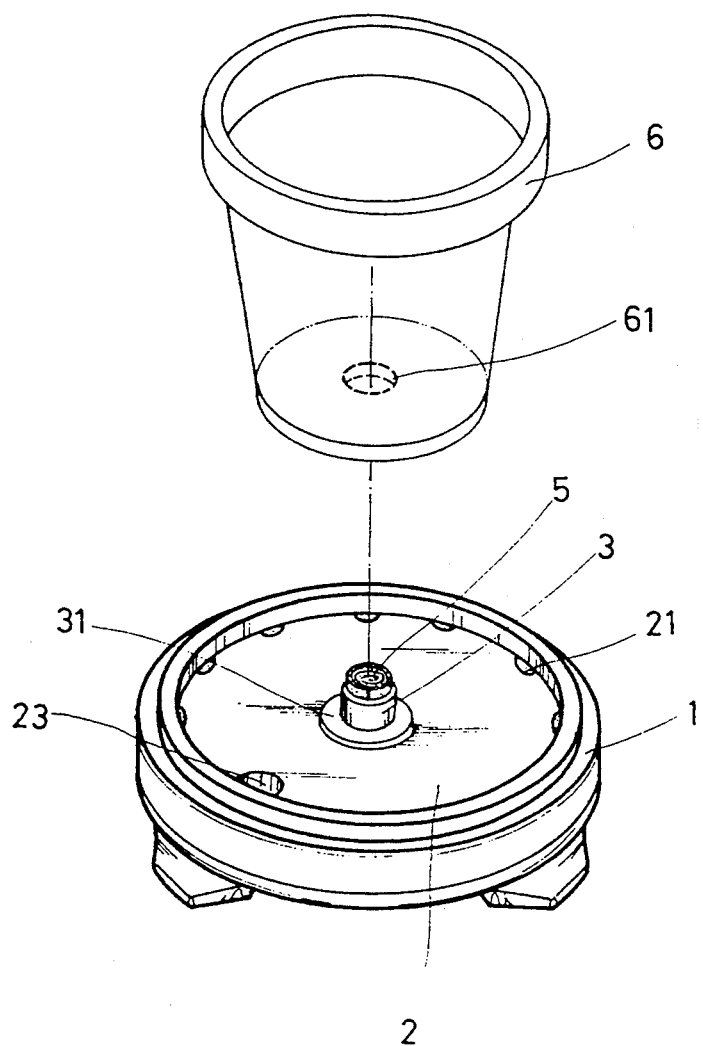
FIG. 3 is a perspective view of the automatic water supply device for a potted plant made according to the instant invention.

Referring to FIGS. 1, 2 and 3, there is shown, an automatic water supply device for a potted plant having a housing, the housing 1 incorporating a reservoir 11 therein. A plurality of supporting ribs 12 are provided in the reservoir 11. A disk member 2 supported above the reservoir 11 by being positioned on the supporting ribs 12. The disk member 2 further includes a plurality of draining holes 21 formed through its periphery. An observation hole 23 is also formed through the disk member 2, for measuring the water level in the reservoir 11. The disk member 2 further has an opening 22 formed through the center of the disk.

A water controlling sleeve 3, which is made from plastic material or the equivalent, is provided. The sleeve 3 is tubular, having a passage formed through its length. The controlling sleeve 3 has a first bead portion 31 formed on one end, and a second bead portion 32 disposed below the first bead portion 31. The distance between the first bead portion 31 and the second bead portion 32 is equivalent to the thickness of the disk member 2. The controlling sleeve 3 further includes a portion 33 where its outer wall has threads formed thereon. A plurality of clip members 34 extend from the bottom of the controlling sleeve 3. A wick member 5, which is made from a sponge, is inserted into the passage of the controlling sleeve 3. A nut member 4 is screwed on to the threaded portion 33 of controlling sleeve 3 for securing the wick member 5. As the nut member 4 is moved toward the clip members 34, the clip members 34 are pressed inwardly. The movement of the clip members 34 inwardly will restrict the water passage provided by the wick member 5. By this arrangement, the rate at which water is supplied to different potted plants can be selectively adjusted.

Referring to FIG. 3, the controlling sleeve 3 is positioned within the opening 22 of the disk member 2 and secured by the first bead portion 31 and the second bead portion 32. The wick member 5 is positioned to project from the portion of sleeve 3 disposed above the first bead portion 31. The water of the reservoir 11 can be added through the drain holes 21 of the disk member 2.

The size of the housing 1 can be made in different sizes, to accommodate different sizes of the pot 6. As the pot 6 is disposed on the disk member 2, the uppermost portion of sleeve 3 and the upper portion of the wick member 5 are inserted into the drainage hole 61 of the pot 6 and abut the soil therein. By this arrangement, the plant in the pot can be supplied with water automatically.

Figure 4:
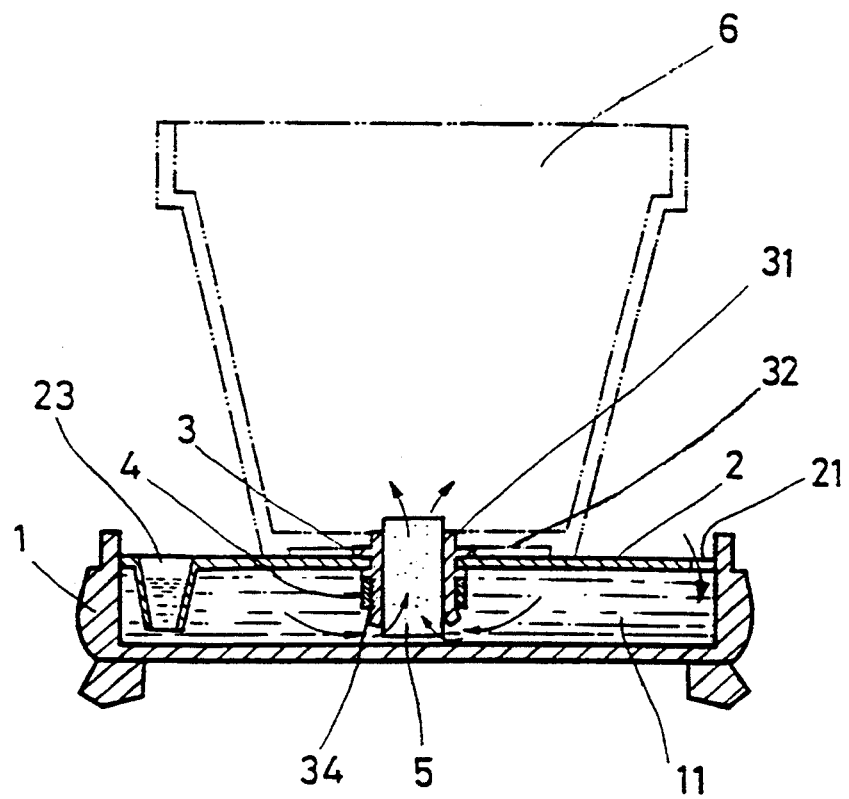
FIG. 4 is a cross-sectional view of the automatic water supply device for a potted plant illustrating the siphoning of water into the pot.

Referring to FIG. 4, the controlling sleeve 3 is shown positioned in the opening 22 of the disk member 2, and secured therein by the first bead portion 31 and the second bead portion 32. Water within the reservoir 11 is drawn upwardly by the wick member 5, the water being subsequently absorbed by the soil in the pot 6. To adjust the rate water is transferred to the soil, the nut 4 is rotated to move it upwardly to loosen the clip members 34, or downwardly to tighten the clip members 34. By this adjustment, the water passage within the wick member 5 will be effected, and thereby the water absorbed by the soil is accurately controlled.

Figure 5:
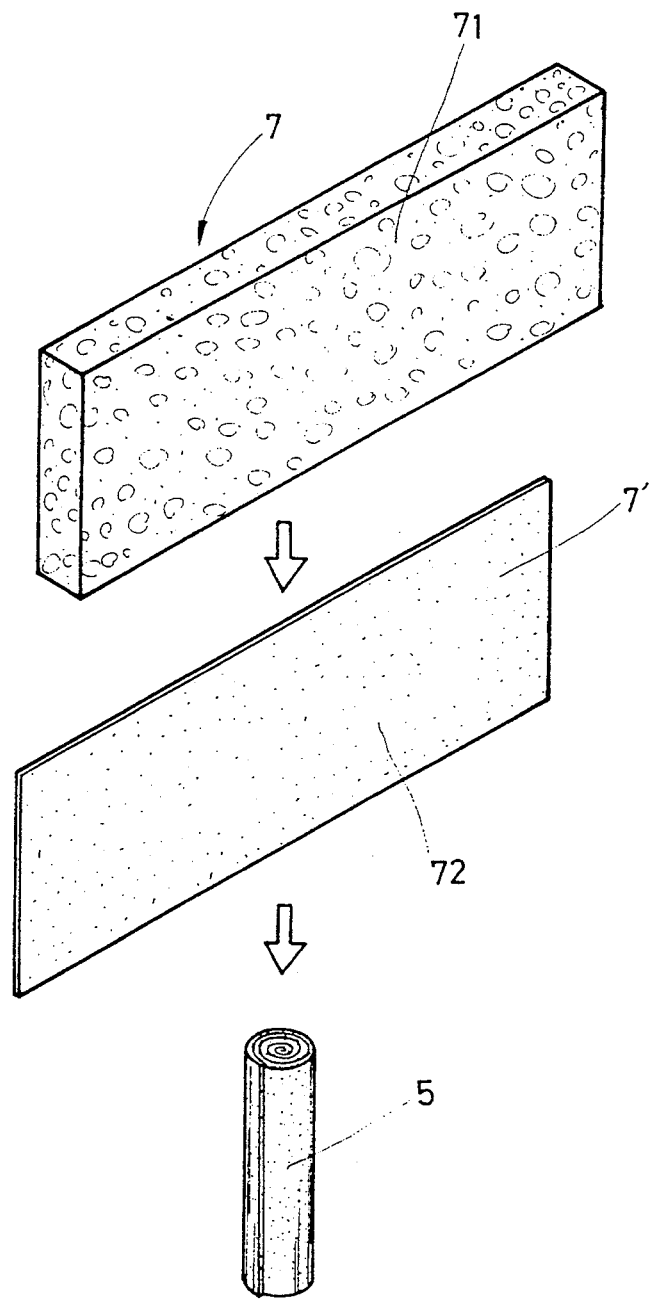
FIG. 5 is an illustration of a wick member of the instant invention.

Referring to FIG. 5, the wick member 5 is shown. The wick member 5 is made from a foam member 7 which has a plurality of air chambers or capsules 71. By a special treatment to the foam member 7, the foam member 7 is flattened to form the foam film 7'. The wall 72 and the air chambers 71 will be disposed in parallel relation to provide a high degree of capillary action. By the process foam film 7' is made, the density and permeability are increased. For example, a foam film 7' having a thickness of one millimeter (1 mm) is made from a foam member 7 of ten millimeter (10 mm) thickness, the density thereby being increased ten times that of the original. The foam film 7' is rolled to form a film stick which defines the wick member 5. This film stick has a homogeneous density and the capillary action therein is very stable. The method of forming the foam film 7' can be used to made film sticks of different densities.

Figure 6:
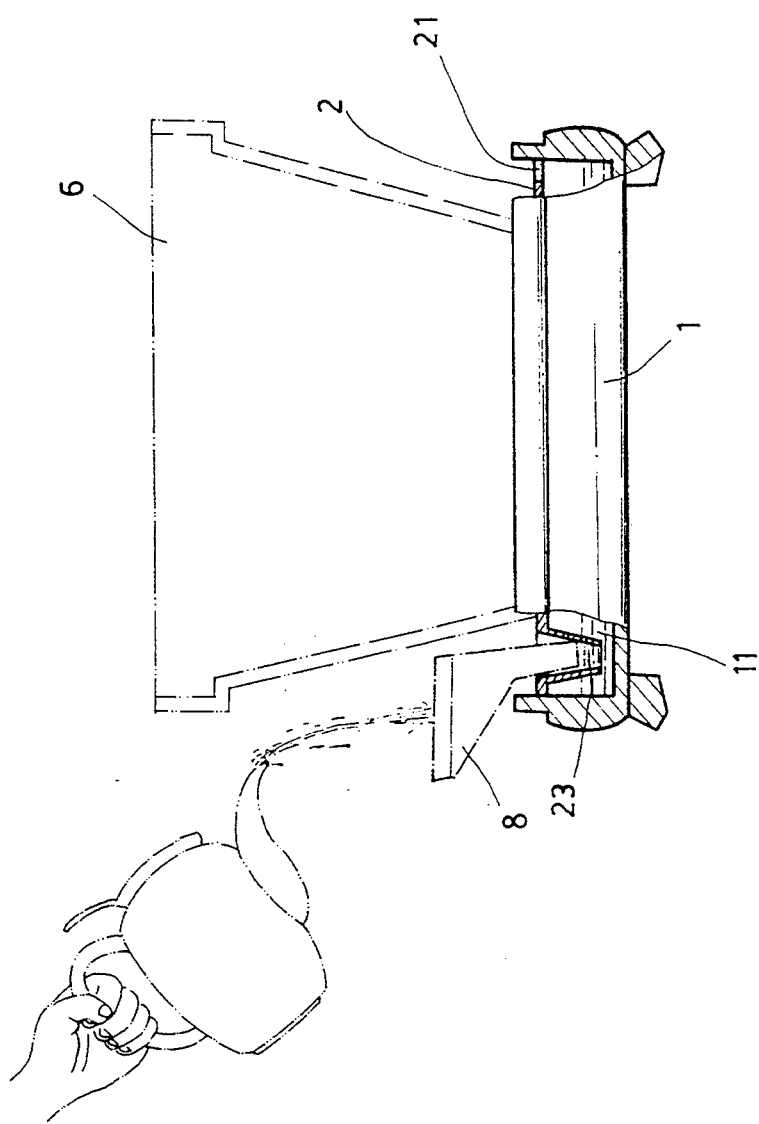
FIG. 6 is an elevation view partially cut-away, illustrating the addition of water to the water supply device.

As shown in FIG. 6, the user can add the water to the reservoir 11 directly through the draining holes 21 of disk member 2. If the pot is too large for adding water in that manner, a funnel 8 can be used to add the water to the reservoir 11 directly through the observation hole 23. The water of the reservoir 11 can thereby be added without any restriction.

The automatic water supply device for a potted plant, as described above, has a number of advantages.

1. The aesthetic appearance of the pot 6 is largely increased by this water supply device. The water within the reservoir 11 can be fed to the pot by the specially designed controlling sleeve 3 with its wick member 5, automatically.
2. The controlling sleeve 3 can adjustably free or block the water passage provided by the wick member 5, providing the best way to supply water to the pot.
3. Since the water supply device is an individual device, the pot 6, disposed thereon, can be easily moved to outdoors for exposure to sunshine.
4. The water level of the reservoir 11 can be easily monitored through the observation hole 23, with water being added in a timely manner, without any delay.

Although the present invention has been described in connection with the preferred embodiment thereof, many other variations and modifications will now become apparent to those skilled in the art without departing from the spirit or scope of the invention. It is preferred, therefore, that the present invention not be limited by the specific disclosure contained herein, but only by the appended claims.

What I claim is:

1. An automatic water supply device for a potted plant, comprising:

a housing having a cavity formed therein, said cavity defining a water reservoir, said cavity having a plurality of spaced upstanding rib members extending from a bottom wall of said housing;

a disk member supported by said plurality of rib members for forming a closure for said cavity, said disk member having a plurality of water entry openings formed therethrough in radially spaced relation about a peripheral portion of said disk member and an observation opening formed through said disk member for observation of a water level of said reservoir, said disk member having a centrally disposed opening formed therethrough;

a longitudinally extended water controlling sleeve having a predetermined length dimension and being formed with a through bore extending longitudinally therein, said water controlling sleeve being disposed in said central opening of said disk member, said water controlling sleeve having a first bead portion formed on a first end thereof and a second bead portion spaced from said first bead portion for capturing said disk member therebetween, said water controlling sleeve including a plurality of clip members formed on a second end thereof and an outer wall portion adjacent said second end having threads formed thereon;

a longitudinally extended wick member disposed within said through bore for transferring water from said reservoir, said wick member having a length dimension greater than said predetermined length dimension of said water controlling sleeve and having one end extending beyond said first end of said water controlling sleeve; and, a nut member threadedly coupled to said outer wall portion of said water controlling sleeve, whereby said plurality of clip members are radially displaced responsive to longitudinal displacement of said nut member to adjust a flow of water through said wick member.

2. The automatic water supply device as recited in claim 1 where said wick member has a cylindrical contour formed from a compressed and rolled foam sheet material.

3. The automatic water supply device as recited in claim 1 where said wick member is formed from a sponge material.

4. The automatic water supply device as recited in claim 3 where said sponge material is compressed and rolled into a cylindrical configuration.

* * * * *